(12) United States Patent
Gong

(10) Patent No.: US 8,812,453 B2
(45) Date of Patent: Aug. 19, 2014

(54) DATABASE ARCHIVING USING CLUSTERS

(75) Inventor: Jeff Gong, Half Moon Bay, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 430 days.

(21) Appl. No.: 12/695,750

(22) Filed: Jan. 28, 2010

(65) Prior Publication Data

US 2011/0184914 A1 Jul. 28, 2011

(51) Int. Cl.
*G06F 17/30* (2006.01)

(52) U.S. Cl.
CPC .............. *G06F 17/30312* (2013.01)
USPC .......... 707/661; 707/662; 707/667; 707/672; 707/673

(58) Field of Classification Search
CPC .............. G06F 17/30; G06F 17/00
See application file for complete search history.

(56) References Cited

U.S. PATENT DOCUMENTS

| | | | | |
|---|---|---|---|---|
| 4,412,365 | A * | 11/1983 | Schmitt | 15/184 |
| 5,243,655 | A * | 9/1993 | Wang | 380/51 |
| 5,401,944 | A * | 3/1995 | Bravman et al. | 235/375 |
| 5,541,449 | A * | 7/1996 | Crane, Jr. et al. | 257/697 |
| 5,646,389 | A * | 7/1997 | Bravman et al. | 235/385 |
| 5,944,814 | A * | 8/1999 | McCulloch et al. | 712/203 |
| 6,065,092 | A * | 5/2000 | Roy | 711/5 |
| 6,240,428 | B1 * | 5/2001 | Yeung et al. | 1/1 |
| 6,289,354 | B1 * | 9/2001 | Aggarwal et al. | 1/1 |
| 6,763,137 | B1 * | 7/2004 | Krtolica | 382/204 |
| 6,771,686 | B1 * | 8/2004 | Ullman et al. | 372/92 |
| 6,868,068 | B1 * | 3/2005 | Jain et al. | 370/252 |
| 7,389,300 | B1 * | 6/2008 | Shah et al. | 1/1 |
| 7,503,050 | B2 * | 3/2009 | Nenov et al. | 719/311 |
| 7,600,063 | B2 * | 10/2009 | Loaiza et al. | 710/200 |
| 7,699,706 | B2 * | 4/2010 | Walker et al. | 463/42 |
| 7,708,635 | B2 * | 5/2010 | Walker et al. | 463/20 |
| 7,730,489 | B1 * | 6/2010 | Duvur et al. | 718/104 |
| 7,806,761 | B2 * | 10/2010 | Walker et al. | 463/16 |
| 7,824,258 | B2 * | 11/2010 | Walker et al. | 463/17 |
| 7,984,072 | B2 * | 7/2011 | Bae et al. | 707/801 |
| 8,038,523 | B2 * | 10/2011 | Walker et al. | 463/20 |
| 8,043,152 | B2 * | 10/2011 | Walker et al. | 463/16 |
| 2003/0018620 | A1 * | 1/2003 | Vishnubhotla | 707/3 |
| 2005/0102387 | A1 * | 5/2005 | Herington | 709/223 |

(Continued)

OTHER PUBLICATIONS

Chevance, Rene, "Server Architectures: Multiprocessors, Clusters, Parallel Systems, Web Servers, and Storage Solutions," Chapter 5—Clusters and Massively Parallel Machines, pp. 315-375, 2005, Elsevier, Inc.*

(Continued)

*Primary Examiner* — Farhan Syed

(57) ABSTRACT

A technique for archiving a relational database having tables of rows may use clusters. Transaction identifiers may be assigned to each of the rows in each of the tables such that all rows belonging to the same application transaction share a unique transaction identifier. Plural hierarchies may be determined, each hierarchy having high level nodes corresponding to the rows in a single table and dependent nodes corresponding to rows in other tables to which the rows in the single table are related in the database. The plural hierarchies may be merged to form plural clusters, one cluster for each unique transaction identifier. Each cluster may have high level nodes corresponding to the plural hierarchies but only those dependent nodes from the plural hierarchies whose transaction identifiers correspond to that of the cluster. The clusters may be stored in one or more files to form an archive.

19 Claims, 5 Drawing Sheets

(56) References Cited

U.S. PATENT DOCUMENTS

| | | | |
|---|---|---|---|
| 2005/0239530 A1* | 10/2005 | Walker et al. | 463/16 |
| 2005/0288096 A1* | 12/2005 | Walker et al. | 463/25 |
| 2006/0010026 A1* | 1/2006 | Nenov et al. | 705/10 |
| 2006/0178187 A1* | 8/2006 | Walker et al. | 463/16 |
| 2006/0201775 A1* | 9/2006 | Tedesco et al. | 194/206 |
| 2006/0217175 A1* | 9/2006 | Walker et al. | 463/16 |
| 2006/0223606 A1* | 10/2006 | Walker et al. | 463/16 |
| 2006/0223607 A1* | 10/2006 | Walker et al. | 463/16 |
| 2006/0227635 A1* | 10/2006 | Walker et al. | 365/201 |
| 2006/0227636 A1* | 10/2006 | Walker et al. | 365/201 |
| 2006/0240890 A1* | 10/2006 | Walker et al. | 463/23 |
| 2006/0287054 A1* | 12/2006 | Walker et al. | 463/17 |
| 2007/0077978 A1* | 4/2007 | Walker et al. | 463/16 |
| 2007/0106771 A1* | 5/2007 | Lucash et al. | 709/223 |
| 2007/0299890 A1* | 12/2007 | Boomer et al. | 707/204 |
| 2008/0032789 A1* | 2/2008 | Walker et al. | 463/30 |
| 2008/0039189 A1* | 2/2008 | Walker et al. | 463/25 |
| 2009/0043797 A1* | 2/2009 | Dorie et al. | 707/101 |
| 2009/0132501 A1* | 5/2009 | Bae et al. | 707/3 |
| 2009/0157775 A1* | 6/2009 | Pederson et al. | 707/204 |
| 2010/0175049 A1* | 7/2010 | Ramsey et al. | 717/115 |
| 2010/0275112 A1* | 10/2010 | Bastos dos Santos et al. | 715/227 |
| 2010/0275113 A1* | 10/2010 | Bastos dos Santos et al. | 715/227 |
| 2011/0047448 A1* | 2/2011 | Bastos dos Santos et al. | 715/227 |
| 2011/0106771 A1* | 5/2011 | McDonald et al. | 707/663 |
| 2011/0178990 A1* | 7/2011 | Ohkawa | 707/662 |
| 2011/0184914 A1* | 7/2011 | Gong | 707/661 |

OTHER PUBLICATIONS

Shepitsen, Andriy, et al., "Personalized Recommendation in Social Tagging Systems Using Hierarchical Clustering," Oct. 23-25, 2008, ACM RecSys '08, pp. 259-266 (8 total pages).*

Wang, F., and Zaniolo, C., "Publishing and Querying the Histories of Archived Relational Databases in XML," 2003, IEEE, Proceedings of the 4th International Conference on Web Information Systems Engineering (WISE '03)., pp. 1-10 (10 total pages).*

Kural, S. Yasemin, "Clustering Information Retrieval Search Outputs," Sep. 1999, PhD Thesis, City University, pp. 1-247 (247 total pages).*

* cited by examiner

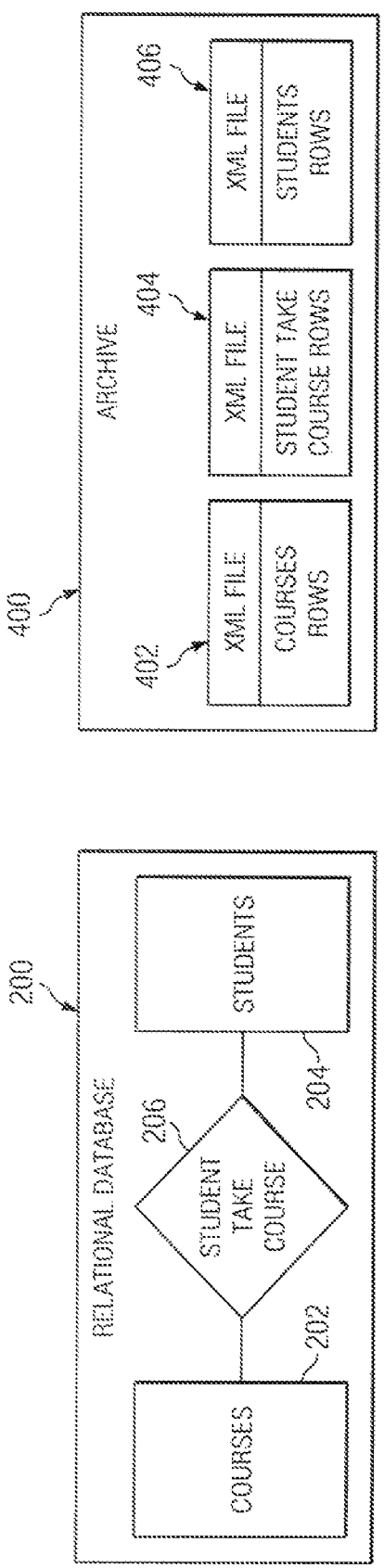

DATABASE ARCHIVING USING CLUSTERS

BACKGROUND

Data archiving refers to techniques for storing large amounts of data for potentially long periods of time and for providing efficient retrieval of relevant portions of the data when it is necessary to do so. Data archiving is employed for a variety of purposes, one of which is to comply with government-driven or policy-driven data retention requirements. Another is to reduce the size and increase the performance of large online database systems by purging some of the database contents into one or more archives.

Inevitably, the size of an archive site for database applications can be enormous. An archive for a terabyte-sized database application might be measured, for example, in petabytes.

BRIEF DESCRIPTION OF THE DRAWINGS

FIG. 2 is a block diagram illustrating an example relational database.

FIG. 3 is a block diagram illustrating tables and rows of the database of FIG. 2.

FIG. 4 is a block diagram illustrating a database archiving scheme according to the prior art.

DETAILED DESCRIPTION

Figure 1:
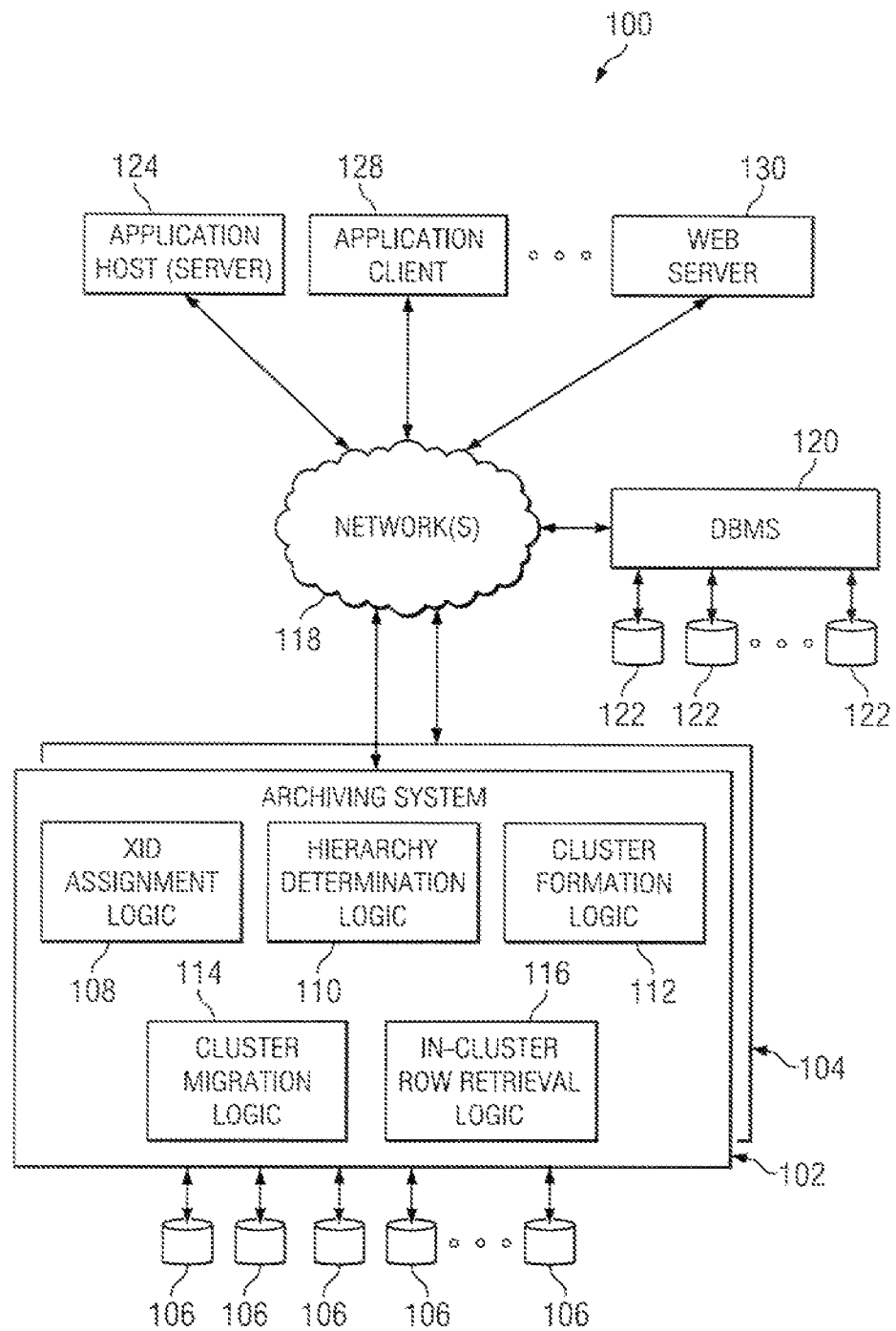
FIG. 1 is a block diagram illustrating a representative example of a variety of systems in which embodiments of the invention may be deployed.

FIG. 1 shows a representative example of a variety of systems 100 in which embodiments of the invention may be deployed. System 100 includes one or more archiving systems 102, 104. Typically, systems 102, 104 will have access to one or more tangible computer-readable storage media 106. Storage media 106 need not be homogeneous, but might instead consist of different types of storage devices such as disk, tape, optical media or other known or yet-to-be-developed media. The media accessible to a given system 102, 104 need not all be of the same type. An archive may be stored on media 106 using a variety of techniques to be further described below.

Systems 102, 104 may be similarly configured or they might be, for example, components of a multi-level archiving system in which one of the systems exhibits faster response and lower capacity while the other system exhibits relatively slower response but larger capacity. Other characteristics might also differentiate systems 102, 104 such as cost or storage type.

One or more of systems 102, 104 may include transaction identifier ("XID") assignment logic 108, hierarchy determination logic 110 and cluster formation logic 112. In addition, they may include cluster migration logic 114 and in-cluster row retrieval logic 116. Behavior of these components will be described in more detail below. The components need not be implemented in discrete modules as they are illustrated for the sake of discussion. Rather, one or more of them may be implemented as an integrated whole. Moreover, they may be implemented in the form of executable, instructions stored on computer-readable storage media such as media 106, or in dedicated hardware, or in some combination thereof.

Archiving systems 102, 104 may be coupled together directly, and they may also be connected to one or more networks 118. Networks 118 may include any kind of connectivity such as an intranet, the Internet, a local area network, a storage area network, switching fabric or the like, or combinations thereof. One of more database management systems ("DBMS") 120 may also be connected to networks 118 and made accessible to archiving systems 102, 104. Typically, one or more computer-readable storage media 122 are accessible to DBMS 120 for the purpose of retaining a database of information pertinent to some application. Archiving systems 102, 104 may extract information from media 122 of DBMS 120 and store the information in an archive on media 106.

Often, at least one server 124 is connected to networks 118. Server 124 may host one or more applications that use and/or modify a database housed in DBMS 120. Such an application may be made available to one or more client computers 128 by connecting client computers to networks 118 as well. Moreover, an application hosted on server 124 might be deployed as a Web application, in which case normally at least one Web server 130 would also be connected to networks 118 and would have access to servers 124 and possibly DBMS 120. Many other variations of systems 100 are also possible.

FIG. 2 illustrates, for the sake of example, one relational database 200 that might be housed in DBMS 120. Such a database will typically contain tables of rows of data. The tables are usually related to one another according to a formal schema. In the example, three tables are shown—a courses table 202, a students table 202, and a linking table 204 labeled student-take-course. More typical databases might contain hundreds of tables, each representing one part of a large corpus of information in a normalized fashion designed to reduce or eliminate storing redundant or duplicate copies of any one piece of information.

In general, tables can have one-to-one, one-to-many or many-to-many relationships with one another. In database 200, both of the courses and students tables 202, 204 have a one-to-many relationship with linking table 206. FIG. 3 provides an example set of data populating the tables and illustrates relationships. In FIG. 3, rows C1 and C2 of courses table 202 each include a course number field and one or more course information fields. Rows S1, S2 and S3 of students table 204 each include a student number field and one or more fields of student information. Rows SC1 and SC2 of student-take-course table 206 each include a course number field and a student number field. Each time a student enrolls in a course, one row may be added to table 206 to indicate which student has enrolled in which course. The dashed lines in the figure indicate that row C2 is related to both or rows SC1 and SC2 because both of those rows have "2" in their course number field, as does row C2. Similarly, row S1 is related to row SC1 because those rows both have "1" in their student number fields. Row S2 is related to row SC2 for the same reason. Row C1 and row S3 are not related to any other rows because no row in the linking table refers to them.

In prior art archiving systems such as archiving system 400 shown in FIG. 4, it is typical to store table data separately. Prior art system 400, for example, stores data from table 202 in an XML file 402, data from table 206 in a separate XML file 404, and data from table 204 in yet another separate XML file 406. The inventor hereof has observed that archiving a relational database in such a manner yields disadvantages—one of which is that to retrieve related information from the prior art archive, numerous different files must be searched and accessed. Moreover, the locations of the pieces of related information within the archive may be distributed widely in space, making retrieval potentially slow and cumbersome.

Figures 5, 6, 7:
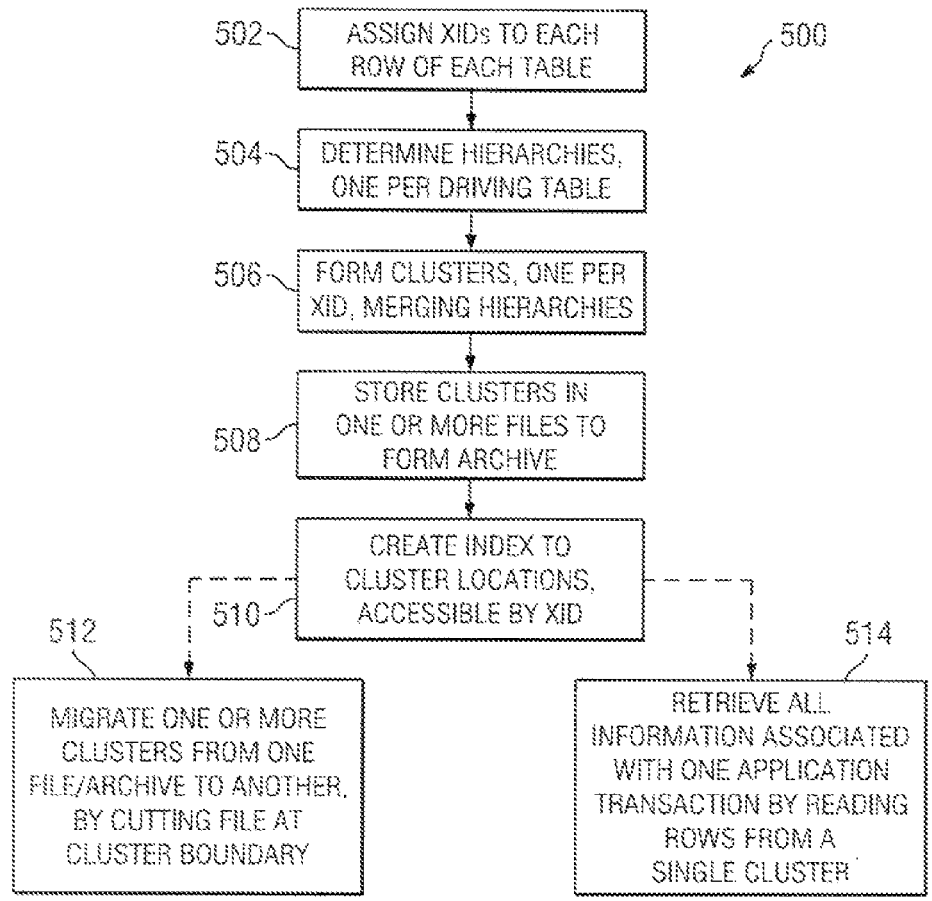
FIG. 5 is a flow diagram illustrating methods of archiving a relational database according to embodiments of the invention.
FIGS. 6 and 7 are schematic diagrams illustrating hierarchies determined from the database of FIGS. 2 and 3 according to embodiments of the invention.
Figure 8:
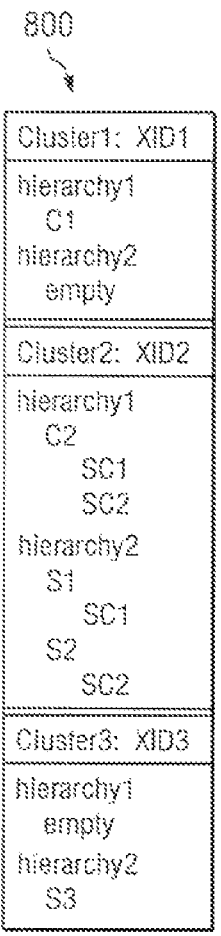
FIG. 8 is a schematic diagram illustrating an archive of clusters formed from the hierarchies of FIGS. 6 and 7 according to embodiments of the invention.

FIG. 5 is a flow diagram illustrating methods 500 of archiving a relational database according to embodiments of the invention. In the context of describing the steps in methods 500, reference will be made to the supporting diagrams in FIGS. 6-11.

In step 502, XID assignment logic 108 assigns transaction identifiers to the rows of the tables in database 200. To do so, it determines all rows belonging to the same application transaction and assigns a unique transaction identifier to those rows so that they share the unique transaction identifier. All rows belonging to a different application transaction will share a different transaction identifier.

The term "application transaction" as used herein shall mean a set of data in a relational database that are related by virtue of entries contained in corresponding fields of rows, or by the entity-relationship schema of the database, or by logic in an application, or some combination of these. Stated differently, an application transaction includes all of the data belonging to one "application partition" or "business partition" as those terms are defined in pending U.S. patent application Ser. No. 12/239,034, titled "System and Method of Obtaining Interrelated Data in a Database," filed Sep. 26, 2008, the complete contents of which are hereby incorporated as if entirely set forth herein. The just-cited patent application will be referred to hereinafter as "the '034 patent application."

XID assignment logic 108 may use any suitable technique to identify rows belonging to the same application transaction, including the techniques described the '034 patent application. In a typical approach, a set of driving tables from the database schema are chosen as starting points from which to follow links contained in corresponding fields of rows, such as the course number fields in tables 202 and 206. The term "driving table" as used herein shall have the meaning given to it in the '034 patent application. Ultimately the closure of all related rows in a database may be identified in this manner.

As an example, row C1 is not related to any other row in the database. So it will not share its XID with any other row. Let the XID for row C1 be 1. Rows SC1, SC2, S1 and S2 are all ultimately related to row C2. So all of these five rows can share an XID. Let that shared XID be 2. Row S3 is not related to any other row. Let the XID for row S3 be 3.

Using the hierarchical model to represent a relational database often requires the creation of multiple hierarchies. This is the case for example database 400. Thus, in step 504, hierarchy determination logic 110 in general may determine several hierarchies of related nodes by determining one hierarchy per driving table. Note that the specifics of how the driving tables are selected may vary; the goal is simply not to lose information that is manifested in the database being archived. An example of how this might be done for example database 400 is illustrated in FIGS. 6 and 7. Hierarchy 1 in FIG. 6 is determined by considering courses table 202 to be the driving table. The table is walked row by row to derive a set of nodes representing how each row is related to other rows in other tables of the database. After this is done, hierarchy 1 will contain a set of high-level nodes representing rows in the courses table. To the extent that any one row of the courses table is related to other rows in the database, the high-level node representing that row will have dependent nodes representing the other rows. Thus each dependent node will represent a row that is related in the database to some row represented by an ancestor node.

In hierarchy 1 of FIG. 6, nodes C1 and C2 are the high-level nodes representing the rows in the courses table. Nodes SC1 and SC2 are dependent nodes. Node SC1 represents a row in linking table 206 that is related to row C2 in courses table 202, as does node SC2. Thus node C2 is an ancestor of both of nodes SC1 and SC2 in the hierarchy. Note that XID 1 has been associated with node C1 as shown in parentheses. XID 2 has been associated with nodes C2, SC1 and SC2.

Hierarchy 2 of FIG. 7 is determined by considering students table 204 to be the driving table. For this reason, nodes S1, S2 and S3 are the high-level nodes in hierarchy 2; they represent the rows of students table 204. Row SC1 is related to row S1 because they share the same entry in their student number fields. Thus node SC1 depends from ancestor node S1 in hierarchy 2. For the same reason, node SC2 depends from ancestor node S2. Row S3 in the students table is not related to other rows. So it has no dependent nodes in the hierarchy. Note that XID 2 has been associated with nodes S1, SC1, S2 and SC2 as shown in parentheses. XID 3 has been associated with node S3.

In step 506, cluster formation logic 112 forms clusters by merging the hierarchies that were determined in step 504. One cluster is formed for each unique XID as illustrated by way of example in FIG. 8. Cluster 1 in the drawing corresponds to XID 1. Cluster 2 corresponds to XID 2. Cluster 3 corresponds to XID 3. Each cluster contains high-level nodes corresponding to each of the hierarchies of step 504, but only those dependent nodes are included whose XID matches that of the cluster. Thus each of the three clusters includes two high-level nodes representing hierarchies 1 and 2. But the representation of hierarchy 2 in cluster 1 contains no dependent nodes. This is because no nodes in hierarchy 2 are associated with XID 1. Node C1 is included in the representation of hierarchy 1 in cluster 1 because that node exists in hierarchy 1 and is associated with XID 1.

In cluster 2, the hierarchy 1 representation includes node C2 and dependent nodes SC1 and SC2 because those nodes exist in hierarchy 1 and are associated with XID 2. Node C1 is not included because it is associated with XID 1. Similar reasoning explains why node S1 with dependent node SC1 and node S2 with dependent node SC2 appear in the hierarchy 2 representation. They all are associated with XID 2. Node S3 is excluded from the hierarchy 2 representation in cluster 2 because it is associated with XID 3.

In cluster 3, the hierarchy 1 representation is empty because no nodes in hierarchy 1 are associated with XID 3. The hierarchy 2 representation includes only node S3 because node S3 is the only node in hierarchy 2 associated with XID 3.

In step 508, clusters 1-3 may be stored in one or more files to form an archive 800. For example, they may all be stored in the same file, they may be stored in separate files, or the three clusters might be stored in two files. The files may be of any suitable type, including XML files. Beneficial results are obtained when each cluster is treated and manipulated as a logical whole or atomic unit. This can be achieved by placing bytes of the same cluster consecutively on storage media either physically or virtually. The interrelationship between different clusters, however, is independent. The latter characteristic provides flexibility in the storage of clusters.

Figure 9:
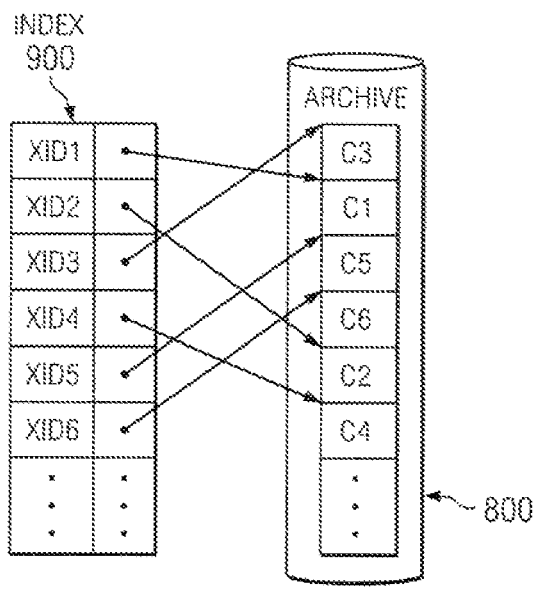
FIG. 9 is a schematic diagram illustrating an index to cluster locations in an archive according to embodiments of the invention.

In step 510, an index may be created to expedite finding the locations of clusters in the archive file or files. In one class of embodiments, the index may be organized so that is searchable by XID. Referring to FIG. 9 by way of example, archive 800 may contain one or more clusters, labeled C1-C6 in the drawing. An index 900 may be organized by XID—as in the lefthand column—and may contain references to locations in the archive where the cluster corresponding to each XID is to be found. The clusters so indexed need not all be located in the same file or on the same storage device.

A number of benefits are achieved by forming archives in accordance with embodiments of the invention. One of them is that no row of database 200 is represented in more than one cluster of archive 800. Another is that all information associated with a single application transaction is located in a single cluster of archive 800. Indeed, as step 514 suggests, in-cluster row retrieval logic 116 may retrieve all information associated with a single application transaction by simply reading row information from a single cluster in archive 800 and not from any other cluster. This enables information retrieval to proceed quickly because data in a cluster may be spatially located relatively close to one another and because data from additional—potentially far away—clusters need not be retrieved.

In another class of embodiments, benefits are obtained by storing the clusters in such a manner that no single cluster is distributed across more than one file. In this class of embodiments, each cluster is treated in the archive as an atomic unit. As long as the contents of a given cluster are kept together, they remain self-contained and can be moved freely from one location to another without the need to find other information related to the same application transaction and moving that along with the cluster. Note that, in this context, the meaning of the phrase "one file" is intended to include one logical file in addition to a traditional single physical file. A logical file may appear to be a single physical file from the point of view of a file system client. But in the implementation of the file system, it is possible to store portions of a single logical file in multiple separate physical files. In the latter case, the file system ensures a logical association between the physical component files in order to maintain the appearance of a single physical file to the client.

For example, in step 512, cluster migration logic 114 can move one or more clusters from a first file or archive, say from archiving system 102, to a second file or archive, say to archiving system 104. Such a step might be performed when migrating part of one archive to another archive in a multi-level archiving system such as those described above.

Figure 11A:
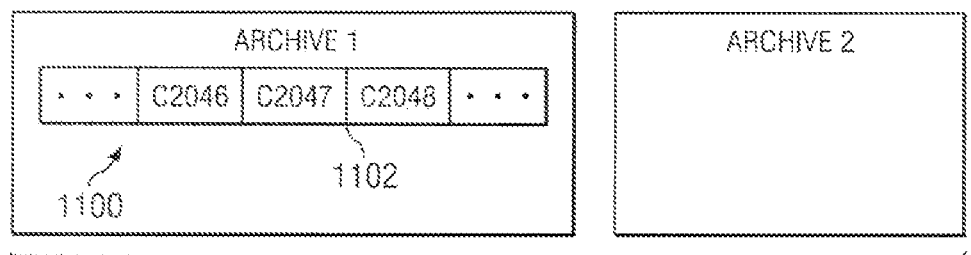
FIGS. 11A and 11B are block diagrams illustrating a technique for migrating portions of an archive by cutting a file at a cluster boundary according to embodiments of the invention.
Figure 11B:
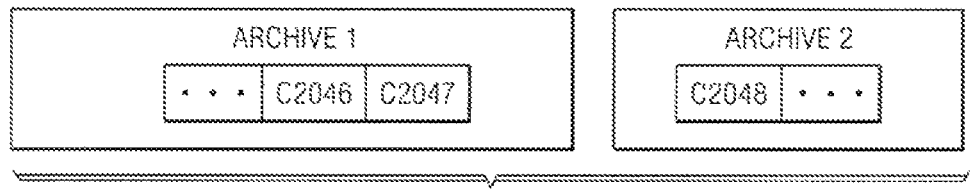

FIGS. 11A and 11B illustrate one technique for accomplishing this. Assume a potentially large archive file 1100 as shown in FIG. 11A that includes clusters C2046, C2047 and C2048 among many others located above and below them in the file. File 1100 can simply be cut at a cluster boundary such as boundary 1102, and the contents in the truncated portion of file 1100 can be moved from archive 1 to archive 2 as shown in FIG. 11B. The result is that cluster C2048 and all those above it now reside in archive 2, while clusters C2047 and below remain in archive 1. Because all row data related to the same application transaction are self-contained within a cluster, application integrity is maintained during such an operation without regard for the location, presence or contents of other clusters in the archive.

Figure 10:
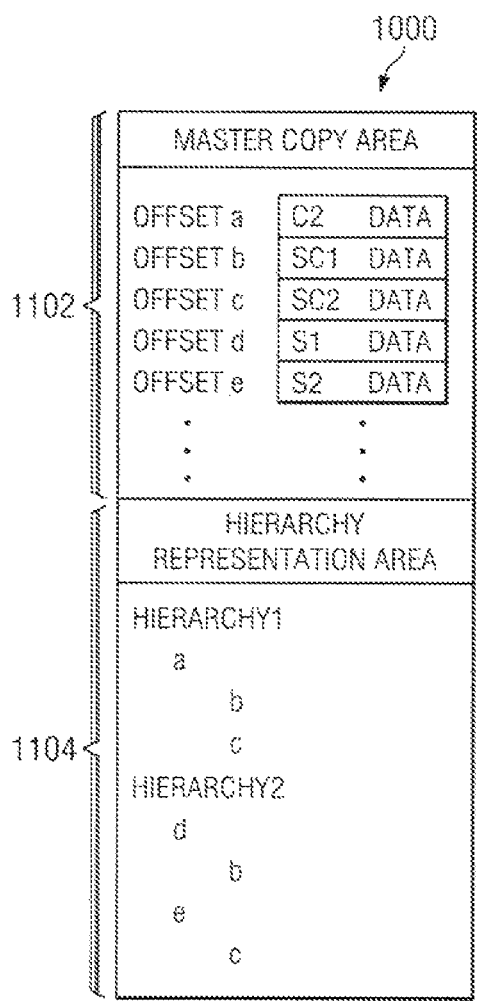
FIG. 10 is a block diagram illustrating a technique for storing data that correspond to a cluster according to embodiments of the invention.

Further space-saving benefits can be achieved by storing each cluster in a format corresponding to that shown in FIG. 10. FIG. 10 illustrates a cluster 1000 stored within an archive file and corresponding logically to cluster 2 in archive 800. In cluster 1000, only one master copy of data representing a row's contents is stored. At positions in the cluster where a given row is to appear, a reference to the master copy of the row's contents is written rather than a duplicate copy of the row's actual contents. For example, the cluster may include a master copy area 1102 and a hierarchy representation area 1104. In master copy area 1102, master copies of data representing row contents may be stored, such as data representing the contents of the rows in cluster 2. Each set of row contents will begin at some offset within the file, labeled in the drawings as offsets a-e. In hierarchy representation area 1104, then, only references to offsets a-e need be written in order to represent the hierarchies of cluster 2 without any duplicated data being stored in the cluster. The technique of placing master copies of data within a cluster instead of placing them in centralized files is made possible because, in embodiments of the invention, no references to the master copies of the data from outside a cluster are necessary.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

What is claimed is:

1. A computer implemented method of archiving a relational database having tables with rows, the method comprising:
   assigning, with a processor, transaction identifiers to the rows in the tables such that all rows belonging to a same application transaction share a same transaction identifier;
   determining, with the processor, plural different hierarchies, each different hierarchy being formatted to represent a different relationship between rows of different ones of the tables, and each of the plural hierarchies corresponding to a different one of the tables, a first hierarchy corresponding to a first table having first high level nodes corresponding to the rows in the first table and having one or more first dependent nodes associated with at least some of the first high level nodes, each of the dependent nodes corresponding to a respective row in another of the tables and having a same one of the transaction identifiers as the row corresponding to the associated high level node;
   merging, with the processor, portions of the plural different hierarchies to form a first cluster associated with a first one of the transaction identifiers, the first cluster including second high level nodes and second dependent nodes, each second high level node identifying a different one of the plural hierarchies, and the second dependent nodes including, from the plural hierarchies, only the first high level nodes and the first dependent nodes having the first transaction identifier; and
   storing plural clusters including the first cluster in one or more files to form an archive.

2. The computer implemented method of claim 1 wherein none of the rows of the database is represented in more than one cluster.

3. The computer implemented method of claim 1, further comprising:

creating an index to locations of the plural clusters in the archive such that the index is searchable by transaction identifier.

4. The computer implemented method of claim 1, further comprising:
cutting one of the files forming the archive at a cluster boundary; and
moving one or more clusters in a truncated piece of the one file to another archive.

5. The computer implemented method of claim 1, further comprising:
retrieving from the archive all information associated with one of the application transactions by reading information from only one cluster in the archive.

6. The computer implemented method of claim 1, wherein storing the plural clusters comprises:
storing only one copy of a data set associated with a row of one of the clusters; and
storing a pointer or an index in the associated row of the cluster, the pointer or index indicating a location where the one copy of the data set is stored.

7. The computer implemented method of claim 1, wherein the plural clusters are stored such that no single cluster is distributed across more than one file.

8. A tangible computer readable medium comprising computer readable instructions, which instructions, when executed, cause a computer to at least:
assign transaction identifiers to rows in tables of a relational database such that all rows belonging to a same application transaction share a same transaction identifier;
determine different hierarchies, each different hierarchy being formatted to represent a different relationship between rows of different ones of the tables and each of the different hierarchies corresponding to a different one of the tables, a first hierarchy of the different hierarchies corresponding to a first table having first high level nodes corresponding to the rows in the first table and having a first dependent node associated with a corresponding one of the first high level nodes, the first dependent node corresponding to a respective row in another of the tables and having a same one of the transaction identifiers as a row corresponding to the corresponding first high level node;
merge portions of the different hierarchies to form a first cluster, the first cluster being associated with a first one of the transaction identifiers, the first cluster including second high level nodes and second dependent nodes, each second high level node identifying a different one of the different hierarchies, and the second dependent nodes including, from the different hierarchies, only the first high level nodes and the first dependent nodes having the first transaction identifier; and
store a set of plural clusters including the first cluster in one or more files to form an archive.

9. A tangible computer readable medium as defined in claim 8, wherein the instructions, when executed, further cause the computer to store one or more clusters in one or more files such that no single cluster is distributed across more than one file.

10. A tangible computer readable medium as defined in claim 8, wherein the archive is created such that no row of the relational database is represented in more than one cluster.

11. A tangible computer readable medium as defined in claim 9, wherein the instructions, when executed, further cause the computer to:
create a second archive;
cut at least one of the files at a cluster boundary; and
move one or more clusters contained in a truncated portion of the file to the second archive.

12. A tangible computer readable medium as defined in claim 8 wherein the instructions, when executed, further cause the computer to:
retrieve, from the first cluster and no other cluster, all of the row data associated with the application transaction corresponding to the first cluster.

13. A tangible computer readable medium as defined in claim 8 wherein:
for each row contained in first cluster, the first cluster comprises only one copy of data representing the contents of the row, and one or more references to the one copy of data are located in the first cluster at a position where the row should appear within a given hierarchy.

14. A system for archiving a relational database having tables with rows, comprising:
transaction identifier assignment logic to assign transaction identifiers to the rows in the tables such that all rows belonging to a same application transaction share a same transaction identifier;
hierarchy determination logic to determine different hierarchies, each different hierarchy being formatted to represent a different relationship between rows of different ones of the tables and each of the different hierarchies corresponding to a different one of the tables, a first hierarchy corresponding to a first table having first high level nodes corresponding to the rows in the first table and having one or more first dependent nodes associated with at least some of the first high level nodes, each of the dependent nodes corresponding to a respective row in another of the tables and having a same one of the transaction identifiers as the row corresponding to the high level node corresponding to the dependent node;
cluster formation logic to merge portions of the different hierarchies to form clusters, a first cluster being associated with a first one of the transaction identifiers, the first cluster including second high level nodes and second dependent nodes, each second high level node identifying a different one of the hierarchies, and the second dependent nodes including, from the hierarchies, only the first high level nodes and the first dependent nodes having the first transaction identifier; and
cluster storage logic to store plural clusters including the first cluster in one or more files to form an archive.

15. The system of claim 14, wherein no row is represented in more than one of the clusters.

16. The system of claim 14, further comprising:
migration logic to move at least one cluster from a first file to a second file by cutting the first file at a cluster boundary.

17. The system of claim 14, further comprising:
row retrieval logic to retrieve all rows associated with a first application transaction by reading the rows from a single cluster.

18. The system of claim 14, wherein, for each row contained in a cluster, only one copy of data representing the content of that row is stored, and a reference to the location of the one copy is stored in that row.

19. The system of claim 14, wherein the clusters are stored in one or more files such that no single cluster is distributed across more than one file.

* * * * *